INVENTORS
DAVID ROYSE
JULES DIRAC
BY John H. Holcombe
AGENT

April 11, 1967 J. DIRAC ETAL 3,314,013

VARIABLE DELAY PULSE GENERATING APPARATUS

Original Filed Dec. 27, 1957 2 Sheets-Sheet 2

United States Patent Office 3,314,013
Patented Apr. 11, 1967

3,314,013

VARIABLE DELAY PULSE GENERATING APPARATUS

Jules Dirac, Poughkeepsie, N.Y., and David Royse, Los Gatos, Calif., assignors to International Business Machines Corporation, New York, N.Y., a corporation of New York Continuation of application Ser. No. 705,525, Dec. 27, 1957. This application June 6, 1963, Ser. No. 286,124
8 Claims. (Cl. 328—61)

This invention is a continuation of our copending patent application, now abandoned, Ser. No. 705,525, filed Dec. 27, 1957, under the title, "Pulse Generating Apparatus."

The present invention relates to electrical pulse generating apparatus and more particularly to electrical pulse generating apparatus producing a series of pulses for application in timing control systems.

In many data processing applications a number of different types of functions are normally performed by the same module within the same machine. These functions may, for example, include addition, multiplication, transfer of data, etc. It is desirable to control the timing of each of such functions by means of timing control pulses. Normally, a single module will respond only to one type of timing control pulse. Therefore, the width and amplitude of timing control pulses required by the same module for the various functions is normally the same. Also, in many cases, each different module will respond only to a different type of timing control pulse. Therefore, a different type of timing control pulse, having a different pulse width and/or amplitude, may be required by the machine to control each various module.

These different types of pulses must follow one another in predetermined order, so that the modules operate one after another in proper sequence. Usually the optimum pulse frequency at which these various functions may be performed by the modules varies according to the function being performed. Thus, it is desirable that the pulse repetition rate of timing control pulses be variable according to the function being performed. Data processing machines to be most useful must also have the ability to automatically change their operation from one function to another selectively under control of machine-developed switching signals. Therefore, it is desirable that the pulse repetition rate of timing control pulses be variable under the direct control of switching signals developed by a data processing machine. Heretofore, data processing machines have not been provided with simple and satisfactory means of directly varying the pulse repetition rate of timing control pulses by machine-developed switching signals.

Accordingly, it is an object of this invention to provide an electrical pulse generating apparatus which supplies a train of identical timing control pulses to each set of apparatus within a data processing machine, and which is capable of supplying a different type of pulse to each different module, wherein the delay between two consecutive pulses, and therefore the pulse repetition rate, may be selectively varied by machine generated switching signals without altering the delay between other consecutive pulses.

Another object of this invention is to provide an improved timing control ring circuit which insures that only a single stage is in an active condition at a given time.

Still another object is to provide improved means for restoring a timing ring to a condition of but a single stage in an active state at one time.

According to a preferred embodiment of the invention, a plurality of monostable devices are connected in cascade in a closed loop, and switching signal controlled means are interposed between one or more of the monostable devices to effect delays in accordance with the received switching signals. The outputs of the monostable devices supply the required timing signals to a data processing machine, and the machine supplies control switching signals to the switching signal controlled means.

The foregoing and other objects, features and advantages of the invention will be apparent from the following more particular description of a preferred embodiment of the invention, as illustrated in the accompanying drawings.

Figure 1:
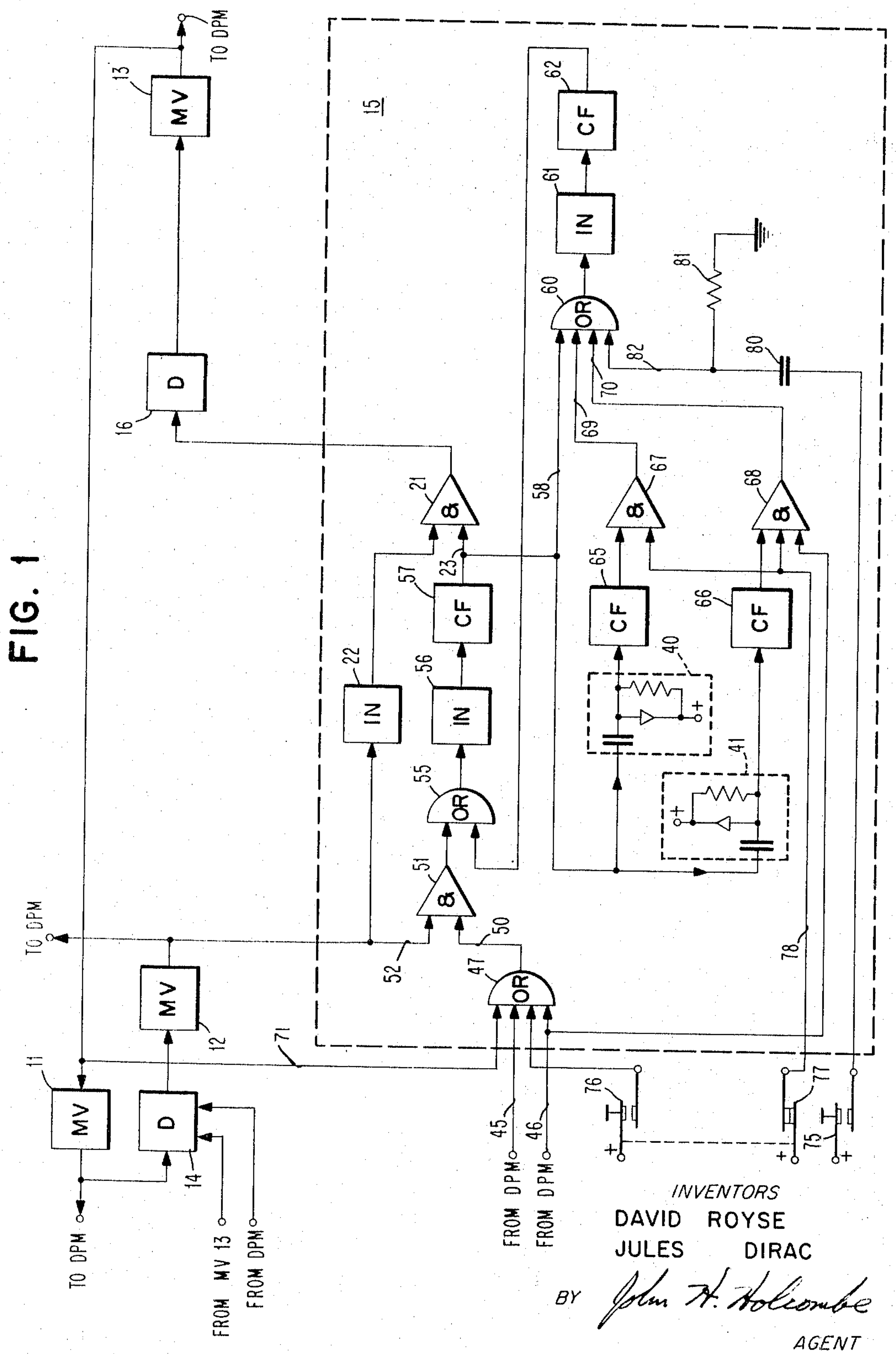
FIG. 1 is a simplified block diagram of the preferred embodiment of a pulse generating means constructed in accordance with the principles of the present invention.

Referring to FIG. 1, a plurality of monostable devices, 11, 12 and 13, are arranged in a closed loop or ring. Such monostable devices have only one permanently stable state ("OFF") and have one quasi-stable state ("ON"). Examples of monostable multivibrators are shown in Pulse and Digital Circuits, Millman and Taub, 1956, on pages 174–199. In such monostable multivibrators, a triggering signal is required to induce a transition from the stable state to the quasi-stable state. The multivibrator may remain in quasi-stable state for a time which is very long in comparison with the time of transition between states. Eventually, however, the multivibrator will return to its stable state from the quasi-stable state, the time being determined by a resistance-capacitance network in the multivibrator. When such multivibrators are arranged in a closed loop or ring, as in FIG. 1, one monostable multivibrator triggers the next succeeding multivibrator in the loop. The duration of time that a particular monostable device remains in the quasi-stable state ("ON") determines the width of its output pulse.

The outputs of the multivibrators 11, 12 and 13 are transmitted to different modules within the data processing machine (not shown). Each of the multivibrators may provide a timing control pulse having a pulse width and/or amplitude different from the timing control pulses provided by the multivibrators. This may be seen in FIG. 2, where output pulses 90, 93 and 96 from multivibrator 11 have a width and amplitude different from the output pulses of the other multivibrators, and where the output pulses 91, 94 and 97 from multivibrator 12 have a width different from the output pulses 92, 95 and 98 from multivibrator 13. Thus, a different pulse may be provided by each multivibrator to the module it is controlling.

The delay between the time one monostable device is operated and the time the next monostable device responds as a result of this operation determines the spacing between the pulses in the series. Delay device 14, 15 and 16 in FIG. 1 govern these spacings. In accordance with the invention, devices 14 and 15 may be selectively controlled by switching signals in order to selectively vary thereby the time between the output timing control signals to thus vary the pulse repetition rate of the timing control signals, as will be discussed in detail. Thus, the data processing machine may directly control the pulse repetition rate of the timing control signals by means of machine-developed switching signals, thereby varying the pulse repetition rate according to the function being performed.

Referring now more particularly to FIG. 1, the control trigger signal generator is shown in block diagram form with the details of the conventional basic units omitted in order to more clearly shown the present invention. The blocks labeled "MV" are monostable multivibrator circuits of the type discussed in the reference referred to above. The blocks labeled "CF" are conventional cathode follower circuits, while those labeled "IN" are inverter amplifiers of the conventional plate-loaded amplifier type. Several "AND" circuits and several "OR" circuits are utilized. An "AND" circuit is a circuit requiring coincidence of input signals on all the input lines to produce an output. These "AND" circuits may be of the conventional diode type. An "OR" circuit is a circuit producing an output when one or more input signals are provided. Again, the "OR" circuits may be of the conventional diode type.

Referring to FIG. 1, monostable multivibrator 13 is triggered by a positive-going edge of a pulse passing through AND circuit 21. AND circuit 21 has two inputs, one of these inputs being supplied by inverter 22, and the other is a delay control signal supplied over line 23. If the line 23 is at a positive level, then a pulse supplied by inverter 22 will pass through AND circuit 21 to the input of delay device 16. Delay device 16 may be any one of a number of types of delay devices, such as a passive delay line or an electronic delay circuit. Delay device 16 provides a definite delay time between the time that a pulse is received at its input and the time that it supplies the pulse at its output. This delay time cannot be selectively altered as opposed to the delay time of delay devices 14 and 15. The output of delay device 16 is applied to multivibrator 13, and the positive-going edges of pulses supplied by delay device 16 trigger multivibrator 13. Thus, only the positive-going edge of a signal supplied from AND circuit 21 through the delay device is effective to trigger multivibrator 13. The timing pulse output of multivibrator 12 is inverted by inverter 22 and, with line 23 at a positive level, the positive-going trailing edge of the inverted output pulse of inverter 22 is gated by AND circuit 21, delayed a fixed time period by delay device 16, and the positive-going output of delay device 16 is applied to the input of multivibrator 13. Thus, with the line 23 at a positive level so that no delay is introduced by delay device 15, the timing pulse output of multivibrator 12 is effective to operate multivibrator 13 at a fixed time, determined by delay device 16, after the termination of the timing output pulse of multivibrator 12. This time relation is shown by the first set of pulses 90, 91, and 92, shown in FIG. 2.

Increases in the delay between the trigger control pulse outputs of multivibrators 12 and 13 are effected by preventing line 23 from becoming positive until the desired time after the output of inverter 22 has switched to the positive level. Therefore, at the desired time, line 23 will be switched to a positive level and AND circuit 21 will gate the resultant positive-going signal through delay device 16 to multivibrator 13. The amount of additional delay is determined by the selected one of R-C time constant networks 40 or 41 that is effectively placed in the feedback loop of delay control circuit 15, as will be explained.

The operation of delay control circuit 15 is controlled by the data processing machine (not shown) by means of inputs 45 and 46 from the data processing machine (not shown) to OR circuit 47. If a positive switching signal appears on either line 45 or line 46, it will pass through OR circuit 47 to appear on line 50 as an input to AND circuit 51. If the signal appears on line 50 in coincidence with the timing control output pulse of multivibrator 12 appearing on line 52, AND circuit 51 will operate delay control circuit 15 to effect a delay. If no such coincidence signal appears on line 50, AND circuit 51 will remain "OFF" and will thereby allow the output of inverter 22 to be gated by AND circuit 21 directly to delay device 16 without delay. Assuming for the purpose of illustration that a positive signal appears on either line 45 or 46 so that line 50 is at a positive level, the timing pulse appearing on line 52 will then pass through AND circuit 51 to OR circuit 55. The output of OR circuit 55 is fed to the input of an inverter amplifier 56, the output of which is fed through cathode follower 57 directly over line 58 to OR circuit 60. Assuming for the purpose of illustration that none of the other inputs to OR circuit 60 is positive, the switching "OFF" of line 58 will cause OR circuit 60 to provide an "OFF" signal to inverter amplifier 61. Inverter amplifier 61 will thereupon supply a positive signal through cathode follower 62 back through OR circuit 55 to the input of inverter amplifier 56. This feedback causes the circuit to "latch" to prevent a positive signal from appearing on line 23 as long as none of the inputs to OR circuit 60 goes positive. This will be called the "LATCHED" state of delay control circuit 15. Therefore, delay control circuit 15 will remain "LATCHED" until a positive signal is supplied through OR circuit 60 from some one of the lines feeding OR circuit 60. While delay control circuit 15 is so "LATCHED," it thereby prevents the operation of multivibrator 13.

When a positive signal is applied through OR circuit 60 to the input of inverter amplifier 61, inverter amplifier 61 provides an "OFF" output through cathode follower 62 to OR circuit 55. It will be remembered that the other input to OR circuit 55 was supplied by AND circuit 51. One of the inputs to AND circuit 51 was the timing control pulse supplied by multivibrator 12, and that timing control pulse cannot occur again until after delay control circuit 15 is turned "OFF" and the ring resumes its cycle of operation. Thus, the line from AND circuit 51 feeding OR circuit 55 will be in a negative state except for the duration of the timing control pulse from multivibrator 12 which will have died away before the output of cathode follower 62 switches to the "OFF" state. So, since there is no positive output from AND circuit 51, the "OFF" signal from cathode follower 62 will be applied to inverter amplifier 56, and inverter amplifier 56 will apply a positive signal through cathode follower 57 to line 23. Then, since the trigger control pulse from multivibrator 12 has died away so that inverter amplifier 22 supplies a positive level to AND circuit 21, the positive-going output from cathode follower 57 is gated through AND circuit 21 to operate multivibrator 13.

Figure 2:
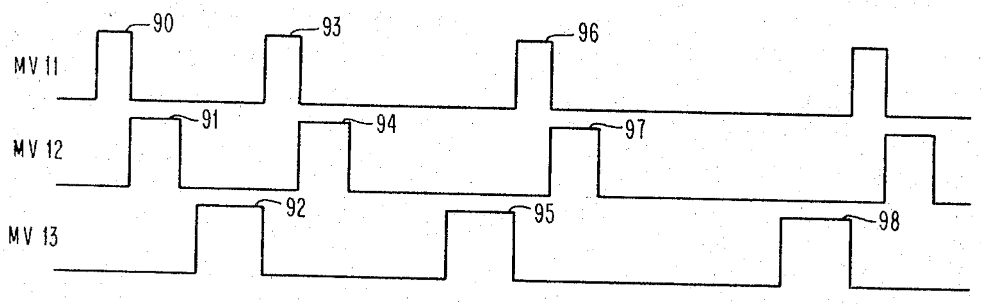
FIG. 2 is a diagrammatic showing, to a common time base, of the pulses generated by the pulse generator of FIG. 1.

The output of cathode follower 57 is applied to the input of R-C time constant network 40 and the input of R-C time constant network 41. R-C time constant networks 40 and 41 are connected to cathode followers 65 and 66, respectively. When delay control circuit 15 is operated so that the output of cathode follower 57 is turned "OFF," R-C time constant networks 40 and 41 each transmit that signal through the associated cathode follower to AND circuits 67 and 68, respectively. The switching "OFF" of cathode followers 65 and 66 insures that no positive signals will be supplied by AND circuits 67 and 68 to input lines 69 and 70 of OR circuit 60. This allows the "OFF" output of cathode follower 57 appearing on line 58 to operate inverter amplifier 61 and thereby "LATCH" delay control circuit 15. As time progresses, the outputs of R-C time constant networks 40 and 41 will gradually become more positive. R-C time constant network 41 has the shorter time constant and thus its output becomes positive at a faster rate than R-C time constant network 40. When the output of R-C time constant network 41 reaches a certain level, cathode follower 66 operates and supplies a positive output to AND circuit 68. Assuming that the other inputs to AND circuit 68 are at a positive level, the output of cathode follower 66 would be gated through the AND circuit to OR circuit 60 and inverter amplifier 61 thereby "unlatching" the delay control circuit and operating multivibrator 13. This time relationship is illustrated by pulses 93, 94 and 95 in FIG. 2. If, instead, one of the other inputs to AND circuit 68 is "OFF," the output of AND circuit 68 will remain "OFF" and the positive output of cathode follower 66 will have no effect. Somewhat later, R-C time constant network 40 will reach the threshold level and operate cathode follower 65 which will provide a positive output to AND circuit 67. Assuming that the other input to AND circuit 67 is positive, the positive swing of cathode follower 65 will be gated by AND circuit 67 to OR circuit 60 to thereby "unlatch" the delay control circuit and operate multivibrator 13. This time relationship is shown in FIG. 2 by the third set of three pulses, 96, 97 and 98. In the condition where the positive-going signal from cathode follower 66 is passed through AND circuit 68 to "unlatch" the delay control circuit, R-C time constant network 40 will cause cathode follower 65 to produce at a later time a positive-going signal at its output through AND circuit 67 that will again apply a positive-going signal to inverter amplifier 61. However, since inverter amplifier 61 was already switched as a result of the pulse applied through AND circuit 68, the application of the second positive-going pulse thereto will have no effect on the operation of the delay control circuit. A positive-going switching signal from the data processing machine (not shown) appearing on line 46 to AND circuit 68 will allow the positive-going output from cathode follower 66 to pass through this AND circuit if the other input is positive, which for the present, will be assumed to be the case. Thus, the application of a positive voltage to terminal 46 will cause R-C time constant network 41 to control the time at which the delay control circuit is turned from its "ON" state to its "OFF" condition to terminate the delay and apply a positive signal on line 23, and thus energize the monostable multivibrator 13 after a predetermined time delay as described above. As stated above, this time relationship is illustrated by pulses 93, 94 and 95 in FIG. 2.

With no positive voltage applied on line 46, the output from cathode follower 66 cannot pass through AND circuit 68 and thus the delay control circuit will not be turned "OFF" until the cathode follower 65 applies its positive-going signal through AND circuit 67. The subsequent operation of multivibrator 13 is by pulse 98 in FIG. 2.

Thus, turning the delay control circuit 15 "ON" by a switching signal from the data processing machine (not shown) on either line 45 or line 46 produces an "OFF" signal on line 23 that will last for a duration depending upon whether the controlling switching signal is applied to line 45 or line 46 by the data processing machine. In this manner, the data processing machine directly controls, by means of switching signals, whether a delay will be introduced, and the duration of that delay.

Another input to OR circuit 47 is line 71. The timing control output pulse of multivibrator 13 is supplied on line 71 through OR circuit 47 to input line 50 of AND circuit 51, so that if the timing signal from multivibrator 13, received on line 50, and the timing signal from multivibrator 12, received on line 52, occur at the same time, meaning that two stages of the ring are "ON" simultaneously, the delay control circuit will be operated. This could happen, for example, when the power supply for the timing ring is first activated. This operation of the delay control circuit 15 will effect a delay, allowing that output pulse from multivibrator 13 to activate, in turn, multivibrators 11 and 12 and then be blocked by AND circuit 21, thereby eliminating the extraneous pulse. Then the delay period ends and delay control circuit 15 activates multivibrator 13 to begin proper operation of the ring. Therefore, the extraneous additional pulses are automatically eliminated and, at the end of the delay time, the positive-going output of AND circuit 21 automatically causes proper operation of the ring to take place immediately after the delay.

If it is desired to advance the ring through a single cycle by a hand-operated switch 75, then hand-operated switch 76 must first be depressed, remaining depressed, to supply a positive signal through OR circuit 47. The depression of switch 76 also causes switch 77 to disconnect line 78 from a positive voltage block AND circuits 67 and 68 so that no output from these AND circuits can occur while switches 76 and 77 are depressed. The depression of switch 75, while switch 76 is in its depressed condition, will advance the ring one cycle at a time. The switch 75 produces this advance by applying a positive signal to coupling network 80 and 81. This positive signal will be transmitted by capacitor 80 to input 82 of OR circuit 60 to thereby "unlatch" the delay control circuit 15. Immediately thereafter, leakage current across resistor 81 will cause line 82 to resume the "OFF" state. Then, after the ring progresses through a complete cycle, the timing signal output of multivibrator 12 will appear on input 52 to AND circuit 51; and, if switch 76 remains depressed so that line 50 remains at a positive level, AND circuit 51 will again turn the delay control circuit 15 "ON." The delay control circuit will remain "ON" until switch 75 is again depressed at which time the delay control circuit will turn "OFF" and again allow a single full cycle of the ring to take place. It is thus seen that the ring may be cycled one cycle at a time by the depression of switch 75.

It has also been seen that the frequency, or pulse repetition rate, of the ring may be controlled by applying signals to lines 45 or 46 as desired to effect the desired amount of delay in the cycle to cause the pulse repetition rate of operation of the ring to be as desired.

It has also been seen that automatic control is provided so that if the ring should initially come "ON" with two of its stages active, then, before the ring has completed a cycle, a delay is introduced to eliminate the "ON" condition of the other stages to thereby cause the ring to automatically assume its proper functioning condition of but a single stage "ON" at a time.

The various timing control signals produced by the ring are supplied to a data processing machine, and the machine may supply switching signals to control the operation of the ring as required by the particular operation of the machine.

Figure 3:
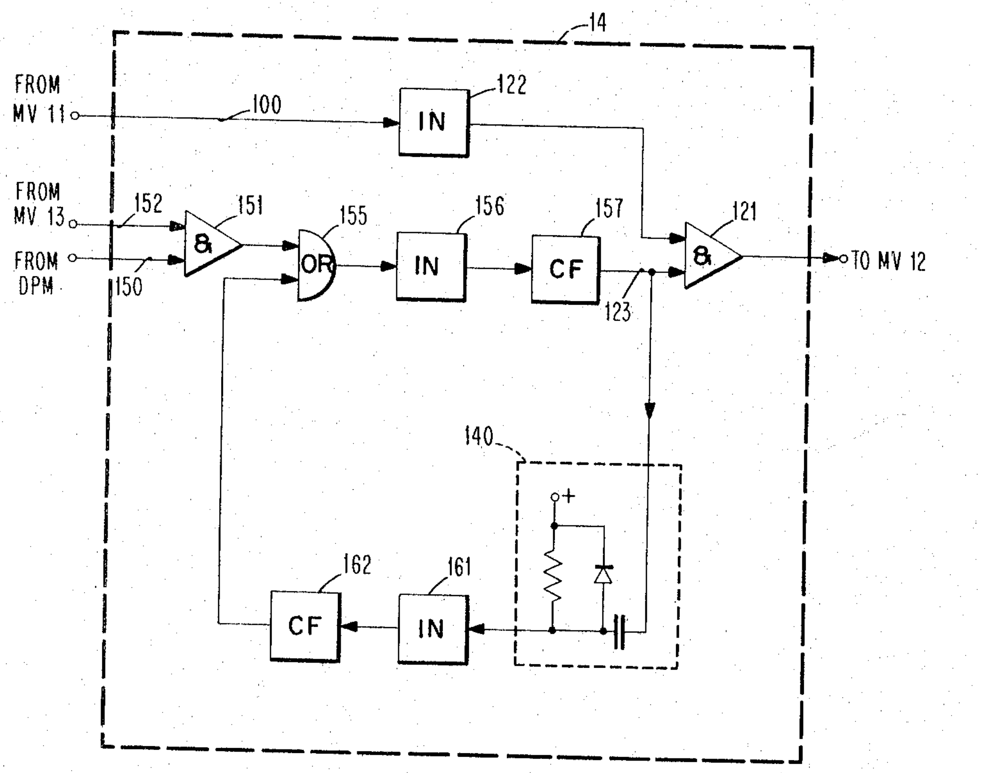
FIG. 3 is a block diagram of delay device 14 of FIG. 1.

Variable delay device 14 of FIG. 1 is shown in detail in FIG. 3. Referring to FIG. 3, delay device 14 is similar to delay device 15, shown in detail in FIG. 1, but has been reduced in elements and in functions so that it is able only to either transmit an incoming timing control pulse without delay or provide one definite period of delay. Since no elements have been added to delay device 14 that are not present in delay device 15, the elements of FIG. 3 are designated by the number of the same element in delay device 15 of FIG. 1, with 100 added thereto. For example, inverter amplifier 122 in FIG. 3 is the same as inverter amplifier 22 in delay device 15 of FIG. 1.

Delay device 14 receives timing control signals from two monostable multivibrators, on line 152 from multivibrator 13 and on line 100 from multivibrator 11. This differs from delay device 15 which received timing control signals from the same multivibrator on both input lines. This is to illustrate that the timing control pulse which may be transmitted without being delayed may be received from one point in the ring, while the pulse which may be delayed is received from another point in the ring. The positive-going control trigger pulse received on line 100 is inverted by inverter amplifier 122 and the resultant "OFF" signal is fed as one of the two inputs to AND circuit 121. Assuming that line 123, the other input to AND circuit 121, is positive, the "OFF" signal received from inverter 122 will turn "OFF" the output of AND circuit 121 to multivibrator 12. Then the positive-going trailing edge of the inverted timing control pulse will be transmitted through AND circuit 121, assuming that line 123 remains positive, and will trigger "ON" multivibrator 12. Thus, if line 123 is at a positive level, the timing control pulse received from multivibrator 11 will be inverted and gated through delay device 14 without appreciable delay and the trailing edge of that pulse will trigger multivibrator 12.

If, however, the signal on line 123 is "OFF," then a pulse received from inverter amplifier 122 will be blocked by AND circuit 121 and a positive-going signal cannot trigger multivibrator 12, thereby introducing a delay until line 123 is switched "ON." Such delay is introduced by way of AND circuit 151. One of the inputs to AND circuit 151 is seen to be the timing control pulse from multivibrator 13 on line 152. If the other input, line 150, is at a positive level, then the timing control pulse received on line 152 will pass through AND circuit 151 to OR circuit 155 and through OR circuit 155 to inverter amplifier 156. Inverter amplifier 156 is connected to a cathode follower 157 and the output of cathode follower 157 is connected by way of R-C time constant network 140 to the input of inverter amplifier 161. The output of inverter amplifier 161 is connected to the input of a cathode follower 162, the output of which is tied back into the OR circuit 155. The operation of this feedback circuit is such that the positive-going timing control pulse received from multivibrator 13 is inverted by inverter amplifier 156. This inverted pulse is transmitted by cathode follower 157 on line 123. This turns "OFF" AND circuit 121, blocking signals received from inverter amplifier 122. The "OFF" output of cathode follower 157 is also transmitted by R-C time constant network 140 to inverter amplifier 161. Inverter amplifier 161 then produces a positive signal at its output which is fed through cathode follower 162 back to OR circuit 155 to thereby "LATCH" delay control circuit 14 so as to maintain the "OFF" signal on line 123 even after AND circuit 151 turns "OFF." This "OFF" signal on line 123 will be maintained for a time determined by the time constant R-C time constant network 140. As the output of R-C time constant network 140 becomes positive, it eventually reaches the point where inverter amplifier 161 will switch and produce an "OFF" output, which is fed through cathode follower 162 to OR circuit 155. By this time, the other input to OR circuit 155 from AND circuit 151 will be "OFF" since the timing control signal from multivibrator 13 has died away, and therefore the "OFF" output from cathode follower 162 will turn "OFF" OR circuit 155. The output from OR circuit 155 will cause inverter amplifier 156 to initiate a positive-going output signal which is transmitted by cathode follower 157 and AND circuit 121 to multivibrator 12 to trigger "ON" the multivibrator. Thus, the "OFF" output on line 123 will terminate at a time following the initiation of the timing control pulse from multivibrator 13 determined by the time constant of R-C time constant network 140.

In order that the timing control signal received from multivibrator 13 may pass through AND circuit 151, it is necessary that line 150 be at a positive potential. This may be accomplished by a positive switching signal received from the data processing machine (not shown) in coincidence wtih the timing control signal.

The time constant of R-C time constant network 140 is longer than the duration of the timing control pulse received from multivibrator 11 in order to maintain line 123 "OFF" until after the output of inverter amplifier 122 switches back to the positive state, to thereby insure that a delay is provided. Thus, the positive-going edge of the signal on line 123 to AND circuit 121 will control the time at which multivibrator 12 is triggered "ON." It may thus be seen that by applying a positive potential to "OR" circuit 155, a time delay is inserted between the occurrence of the output of multivibrator 11 and the occurrence of the output from multivibrator 12. The frequency of operation of the timing ring is thus altered, while the width and amplitude of the timing control pulses remain fixed.

While the invention has been particularly shown and described with reference to a preferred embodiment thereof, it will be understood by those skilled in the art that various changes in form and details may be made therein without departing from the spirit and scope of the invention.

We claim:

1. Apparatus for generating timing signals comprising:
a plurality of monostable devices arranged in sequence, each device having an input and an output and each adapted to deliver a signal on its output in response to a signal on its input;
coupling circuit means for coupling each of said outputs to the next succeeding input;
a delay device; and
means responsive to a coincidence of output signals from two of said monostable devices for switching said coupling circuit means through said delay device.

2. Apparatus for generating timing signals comprising:
a plurality of monostable devices arranged in sequence, each device having an input and an output and each adapted to deliver a signal on its output in response to a signal on its input;
a first channel connecting each of said outputs to the input of the next succeeding monostable device of the sequence for transmitting a signal appearing at an output to the next succeeding input;
a second channel connected to the input of one of said monostable devices;
a delay device in said second channel;
a source of switching signals;
means responsive to the coincidence of a switching signal from said source of switching signals and a signal from the output of a monostable device for enabling said second channel; and
means responsive to a signal from said delay device for disabling said first channel between said one of said monostable devices and the next preceding monostable device, thereby preventing said first channel from transmitting a signal to said one of said monostable devices.

3. Apparatus for generating timing signals comprising:
a plurality of monostable devices arranged in sequence, each device having an input and an output and each adapted to deliver a signal on its output in response to a signal on its input;
a first channel connecting the output of a first of said monostable devices to the input of a second of said monostable devices;
a second channel connecting the output of said first of said monostable devices to the input of said second of said monostable devices;
a delay device in said second channel;
switching signal responsive means for enabling said second channel and disabling said first channel, whereby the time between a signal from the output of said first of said monostable devices and a signal in response thereto at the output of said second of said monostable devices may be selectively varied under control of said switching signal responsive means.

4. Apparatus according to claim 3 further characterized by the provision of a source of switching signals, and wherein said switching signal responsive means is jointly responsive to a switching signal from said source of switching signals and a signal from the output of said first of said monostable devices.

5. Apparatus according to claim 4 wherein said delay device comprises a plurality of selectable time constant networks.

6. Apparatus according to claim 5 wherein said source of switching signals is effective to select a particular one of said time constant networks.

7. Apparatus according to claim 6 wherein said source of switching signals includes a coupling to the output of said second of said monostable devices.

8. A timing signal generating circuit comprising:
a plurality of monostable devices arranged in a ring, each having an input and an output and each delivering a signal at its output in response to a signal at its input;
a plurality of coupling means coupling the output of each of said monostable devices to the input of the next succeeding monostable device;
disabling means responsive to the output signal of a first one of said monostable devices to disable the one of said coupling means coupled to the input of a second one of said monostable devices;
a delay device connected to the output of one of said monostable devices and adapted to deliver a signal after a predetermined time following a signal from said output; and
means for coupling the signal delivered by said delay device to the input of said second monostable device.

References Cited by the Examiner

UNITED STATES PATENTS 2,835,804 5/1958 Luther ---------- 328—207 XR

ARTHUR GAUSS, *Primary Examiner.*

S. MILLER, *Assistant Examiner.*